Figure 1:
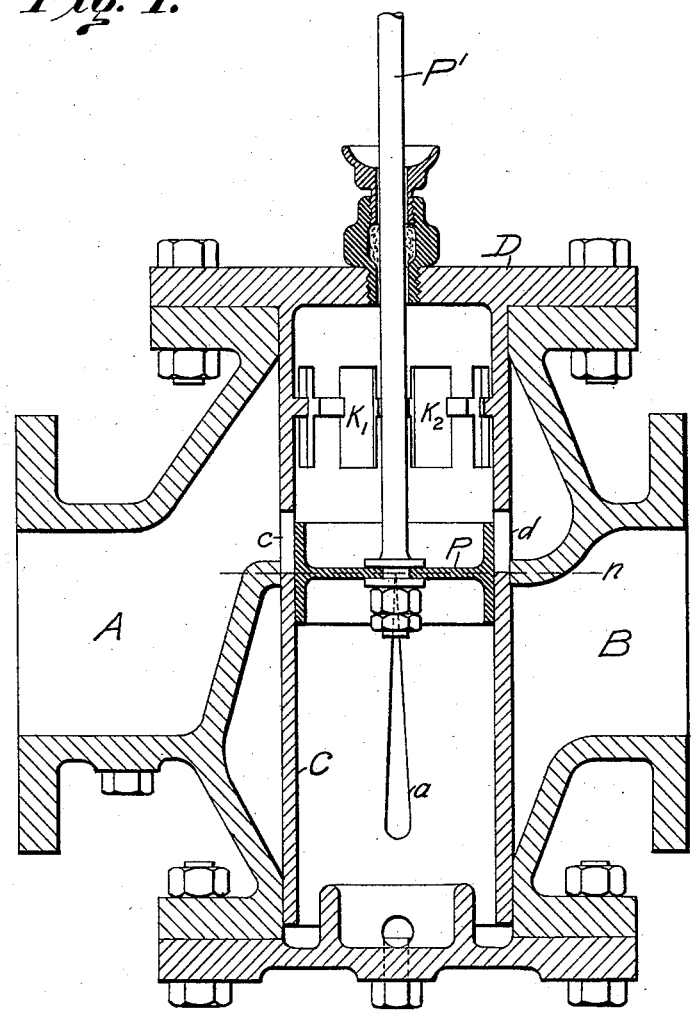

N. POPOFF.
APPARATUS FOR MEASURING THE SPEED OF STEAM TRAVELING ALONG STEAM CONDUITS.
APPLICATION FILED MAR. 23, 1910.

1,068,926.

Patented July 29, 1913.

3 SHEETS—SHEET 1.

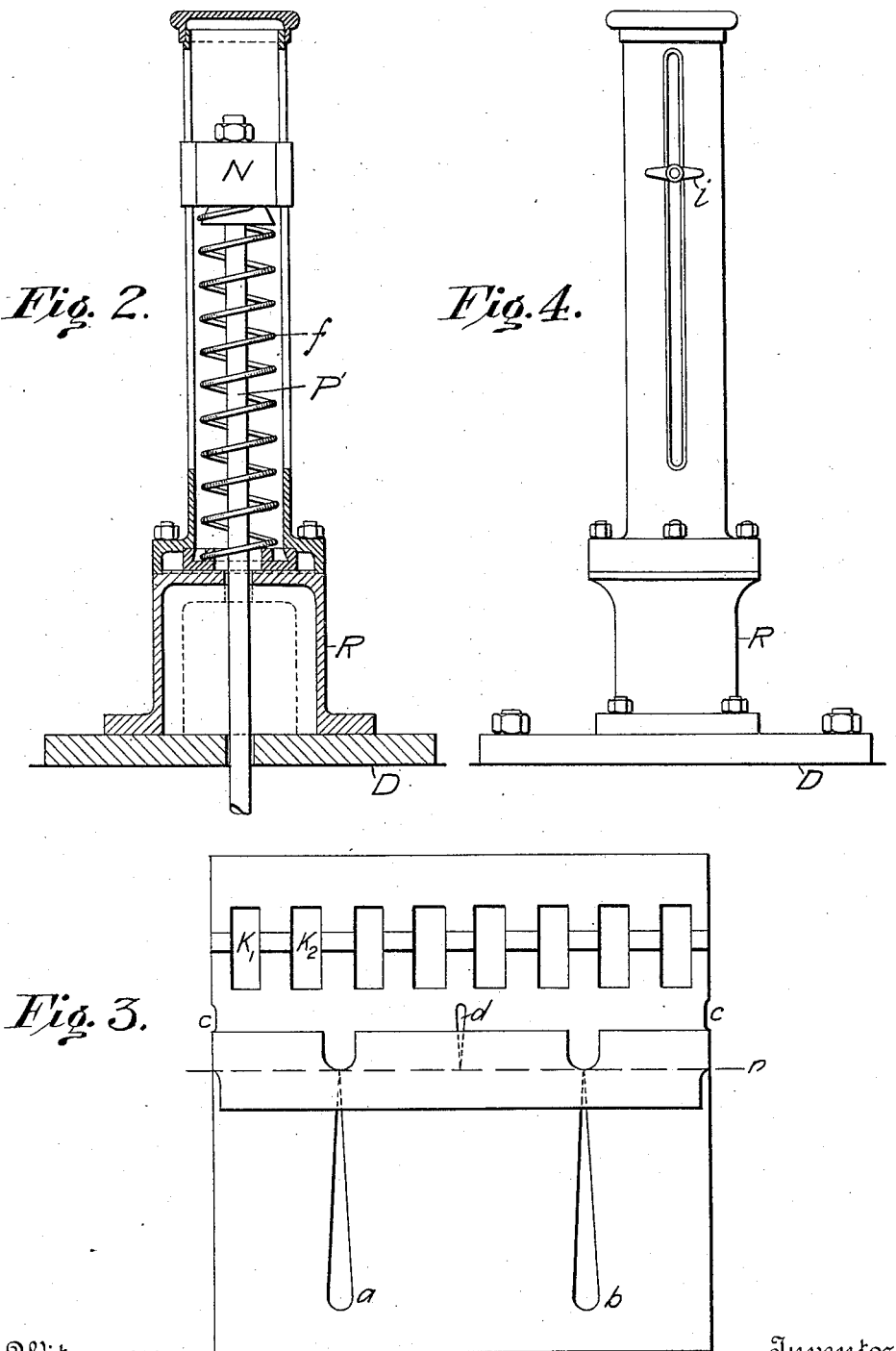

N. POPOFF.
APPARATUS FOR MEASURING THE SPEED OF STEAM TRAVELING ALONG STEAM CONDUITS.
APPLICATION FILED MAR. 23, 1910.
1,068,926. Patented July 29, 1913.
3 SHEETS—SHEET 3.
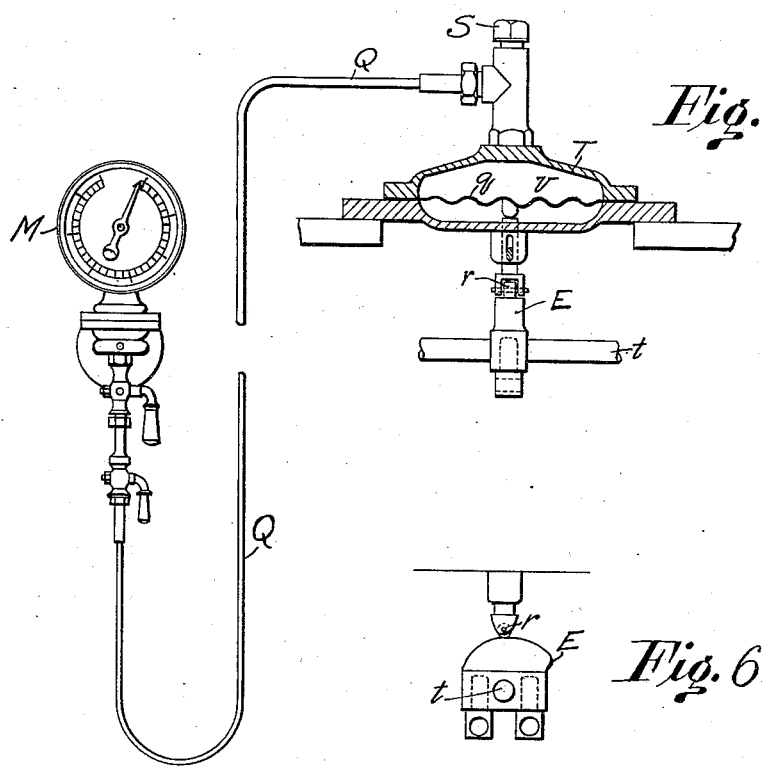

UNITED STATES PATENT OFFICE.

NICHOLAS POPOFF, OF ST. PETERSBURG, RUSSIA.

APPARATUS FOR MEASURING THE SPEED OF STEAM TRAVELING ALONG STEAM-CONDUITS.

1,068,926. Specification of Letters Patent. Patented July 29, 1913.

Application filed March 23, 1910. Serial No. 551,139.

*To all whom it may concern:*

Be it known that I, NICHOLAS POPOFF, a subject of the Emperor of Russia, and a resident of St. Petersburg, Russia, electrical engineer, have invented a new and useful Improvement in Apparatus for Measuring the Speed of Steam Traveling Along a Steam-Conduit, of which the following is a specification.

In the drawings my new apparatus for measuring the speed of steam traveling along steam pipe lines is illustrated, Figure 1 being a vertical section of the lower part of my apparatus; Fig. 2 a vertical section of the upper part of my apparatus; Fig. 3 shows the cylinder and piston developed; Fig. 4 is a side view of my upper part of the apparatus; Figs. 5 and 6 show the arrangement for transmitting the indications of the device to a distant place.

Where several boilers are connected by one general pipe which supplies steam to an engine, the art has not afforded up to the present time any means for ascertaining what quantity of steam is supplied by each of the boilers separately at any given moment. It is possible that one boiler is working under a great load, while another one supplies hardly any steam at all.

My apparatus, which makes it possible to ascertain the work of each boiler of a system consists of the following parts: A bronze cylinder C (Fig. 1) is placed inside the casing of the device A, B, made of steel, or cast-iron. A fitting R (Figs. 2 and 4) containing a verified spring $f$, is mounted on the flange D of this cylinder. The walls of the cylinder C have tapering longitudinal slots $a$, $b$ in the lower part and $c$, $d$ in the upper part, as shown in Figs. 1 and 3. Inside the cylinder is a sliding piston P, which on moving from the line of rest $n$ downwardly, more or less, dependent on the quantity of steam supplied by the boiler, compresses by means of the piston rod P′ and member N the spring $f$ (Fig. 2) and opens a free passage for the exit of steam through the openings $K_1$ $K_2$ . . . . . and $a$, $b$ into the pipe B (Figs. 1 and 3). The indicator $i$ (Fig. 4) shows the degree of spring compression and thereby the speed or volume of steam.

We will suppose that the apparatus is installed in the steam pipe in such a manner that the boiler is on the side marked A and the valve and pipe connecting it with the main steam pipe are on the side of B. If the valve is closed and the boiler does not supply steam, the piston is under an equal pressure on both sides, as the steam from the boiler fills the interior space of the apparatus through leakage past the piston. When the valve is open and the boiler supplies steam, the pressure under the piston falls and the latter moves downwardly, opening the passage $a$, $b$ and compressing the spring $f$, until an equilibrium is attained. The steam passes at the same time through the longitudinal openings $a$, $b$ of the cylinder C. The length of stroke which the piston makes, until an equilibrium is attained, depends on the speed or volume of the steam and serves as a measure for determining the volume of steam passing at any time. If the steam valve is closed, the pressure on both sides of the piston becomes equalized and the piston again owing to the influence of the spring returns to the position of rest $n$. If a boiler, being connected to a main steam pipe, not only does not give steam owing to the cooling of the fire box, but even becomes a consumer of steam, the piston moves upwardly and opens the openings $c$ and $d$.

The position of the piston and therefore the speed and volume of the steam passing at any time is indicated on the apparatus by the pointer $i$.

In the case of the moving parts of the apparatus requiring repair, the cylinder C may be taken out and the casing of the device closed with a blind flange of ordinary construction, not shown in the drawings. My apparatus may be not only used for the measurement of speeds and volumes of steam and gases, but for liquids as well—for water in water pipes, for instance.

For transmitting the indications of the apparatus to the stoker or to a distant point the following device may be used. This device (Fig. 5) consists of two parts viz: a gage M and a transmitter T. This latter comprises a gage casing V furnished at the top with a short pipe, closed by a plug S, and intended for filling the system with liquid, water, glycerin, oil or the like. The gage M is connected to the transmitter by means of a tube Q. The guide N of the spring $f$ is connected by suitable means (not shown) with the axle $t$ on which is mounted an eccentric E (Fig. 6). On the rotation of the axle, the eccentric presses on a pin $r$ and thereby on the diaphragm $f$, mounted in the casing $v$ of the transmitter T. The pressure formed in the liquid is transmitted through tube Q to the gage M and serves as a measure according to the angle of rotation of the axle $t$.

What I claim is:

An apparatus for measuring and indicating the speed or volume of steam passing through a conduit, comprising a casing, a vertical cylinder mounted in said casing and having openings, a piston adapted to reciprocate in said cylinder, thereby covering and uncovering the openings therein, a fitting (R) mounted on said casing, a piston rod of considerable diameter, extending into said fitting and carrying said piston, a compression spring placed in said fitting and connected to said piston rod, so as to expand and contract respectively as the piston moves up and down in said cylinder, a guide for said spring and means connected with said guide for transmitting its indications to a distant place.

In testimony whereof, I have signed my name to this specification in the presence of two subscribing witnesses.

NICHOLAS POPOFF.

Witnesses:
H. A. LOVIAGUINE,
A. TSCHERALOFF.

Copies of this patent may be obtained for five cents each, by addressing the "Commissioner of Patents, Washington, D. C."